US009355684B2

(12) United States Patent  
DeYonker et al.

(10) Patent No.: US 9,355,684 B2  
(45) Date of Patent: *May 31, 2016

(54) THUMBNAIL GENERATION AND PRESENTATION FOR RECORDED TV PROGRAMS

(71) Applicant: Microsoft Technology Licensing, LLC, Redmond, WA (US)

(72) Inventors: Aaron DeYonker, Seattle, WA (US); Jeffrey C. Fong, Seattle, WA (US); Todd San Jule, Woodinville, WA (US); Zhike Kong, Beijing (CN); Bin Lin, Beijing (CN); Nishad Mulye, Sammamish, WA (US); Joseph Alton Schrader, Woodinville, WA (US); Thomas H. Taylor, Redmond, WA (US); Xinli Zou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,915

(22) Filed: Jun. 8, 2015

(65) Prior Publication Data

US 2015/0269969 A1 Sep. 24, 2015

Related U.S. Application Data

(63) Continuation of application No. 10/900,923, filed on Jul. 28, 2004, now Pat. No. 9,053,754.

(51) Int. Cl.
*H04N 21/4147* (2011.01)
*G11B 27/34* (2006.01)
(Continued)

(52) U.S. Cl.
CPC ............... *G11B 27/34* (2013.01); *G11B 27/10* (2013.01); *G11B 27/105* (2013.01);
(Continued)

(58) Field of Classification Search
None
See application file for complete search history.

(56) References Cited

U.S. PATENT DOCUMENTS 5,333,091 A 7/1994 Iggulden et al.
5,442,633 A 8/1995 Perkins et al.
(Continued)

FOREIGN PATENT DOCUMENTS

EP 0597450 5/1994
EP 1168840 1/2002
(Continued)

OTHER PUBLICATIONS

U.S. Appl. No. 10/179,161, filed Jun. 24, 2002 inventors Jin-Lin Chen & Wei-Ying Ma entitled "Function-based Object MOdel for Web Page Display in a Mobile Device".
(Continued)

*Primary Examiner* — Mark D Featherstone
(74) *Attorney, Agent, or Firm* — Aaron Chatterjee; Judy Yee; Micky Minhas

(57) ABSTRACT

Thumbnail images representative of recorded TV programs are generated and presented to aid a user in browsing the recorded TV programs. In one implementation, a temporary thumbnail image is generated when a TV program first starts recording. The temporary thumbnail is used to populate any user interface (UI) screens that reference the recoded TV program. Once the TV program has reached a threshold amount of recording (e.g., a prescribed duration of recording, or completion of the recording), a permanent thumbnail image is generated and associated with the TV program. The permanent thumbnail is then presented in any subsequent UI screens, replacing the temporary thumbnail. In another implementation, display of the thumbnail images in the UI screens may be further controlled by setting preferences, such as parental controls.

20 Claims, 6 Drawing Sheets

(51) Int. Cl.
  *G11B 27/10* (2006.01)
  *G11B 27/32* (2006.01)
  *H04N 5/445* (2011.01)
  *H04N 21/431* (2011.01)
  *H04N 21/433* (2011.01)
  *H04N 21/44* (2011.01)
  *H04N 21/4402* (2011.01)
  *H04N 21/472* (2011.01)
  *H04N 21/475* (2011.01)
  *H04N 21/81* (2011.01)
  *H04N 21/84* (2011.01)

(52) U.S. Cl.
  CPC ............ *G11B 27/327* (2013.01); *G11B 27/329* (2013.01); *H04N 5/44543* (2013.01); *H04N 5/44591* (2013.01); *H04N 21/4147* (2013.01); *H04N 21/4316* (2013.01); *H04N 21/4331* (2013.01); *H04N 21/4334* (2013.01); *H04N 21/44008* (2013.01); *H04N 21/440263* (2013.01); *H04N 21/4755* (2013.01); *H04N 21/47214* (2013.01); *H04N 21/47217* (2013.01); *H04N 21/8153* (2013.01); *H04N 21/84* (2013.01)

(56) References Cited

U.S. PATENT DOCUMENTS

| | | | |
|---|---|---|---|
| 5,497,430 | A | 3/1996 | Sadovnik et al. |
| 5,530,963 | A | 6/1996 | Moore et al. |
| 5,625,877 | A | 4/1997 | Dunn et al. |
| 5,642,294 | A | 6/1997 | Taniguchi et al. |
| 5,659,685 | A | 8/1997 | Williams et al. |
| 5,710,560 | A | 1/1998 | Cohn |
| 5,745,190 | A | 4/1998 | Ioka |
| 5,751,378 | A | 5/1998 | Chen et al. |
| 5,774,593 | A | 6/1998 | Zick et al. |
| 5,778,137 | A | 7/1998 | Nielsen et al. |
| 5,801,765 | A | 9/1998 | Gotoh et al. |
| 5,821,945 | A | 10/1998 | Yeo et al. |
| 5,835,163 | A | 11/1998 | Liou et al. |
| 5,884,056 | A | 3/1999 | Steele |
| 5,884,058 | A | 3/1999 | Narayan et al. |
| 5,900,919 | A | 5/1999 | Chen et al. |
| 5,901,245 | A | 5/1999 | Warnick et al. |
| 5,911,008 | A | 6/1999 | Niikura et al. |
| 5,920,360 | A | 7/1999 | Coleman, Jr. |
| 5,952,993 | A | 9/1999 | Matsuda et al. |
| 5,956,026 | A | 9/1999 | Ratakonda |
| 5,959,697 | A | 9/1999 | Coleman, Jr. |
| 5,966,126 | A | 10/1999 | Szabo |
| 5,983,273 | A | 11/1999 | White et al. |
| 5,990,980 | A | 11/1999 | Golin |
| 5,995,095 | A | 11/1999 | Ratakonda |
| 6,020,901 | A | 2/2000 | Lavelle et al. |
| 6,047,085 | A | 4/2000 | Sato et al. |
| 6,072,496 | A | 6/2000 | Guenter et al. |
| 6,100,941 | A | 8/2000 | Dimitrova et al. |
| 6,166,735 | A | 12/2000 | Dom et al. |
| 6,168,273 | B1 | 1/2001 | Dupraz et al. |
| 6,182,133 | B1 | 1/2001 | Horvitz |
| 6,232,974 | B1 | 5/2001 | Horvitz et al. |
| 6,236,395 | B1 | 5/2001 | Sezan et al. |
| 6,282,317 | B1 | 8/2001 | Luo et al. |
| 6,292,589 | B1 | 9/2001 | Chow et al. |
| 6,298,145 | B1 | 10/2001 | Zhang et al. |
| 6,307,550 | B1 | 10/2001 | Chen et al. |
| 6,332,163 | B1 | 12/2001 | Bowman-Amuah |
| 6,353,824 | B1 | 3/2002 | Boguraev et al. |
| 6,389,168 | B2 | 5/2002 | Altunbasak et al. |
| 6,404,925 | B1 | 6/2002 | Foote et al. |
| 6,408,128 | B1 | 6/2002 | Abecassis |
| 6,421,675 | B1 | 7/2002 | Ryan et al. |
| 6,449,251 | B1 | 9/2002 | Awadallah et al. |
| 6,462,754 | B1 | 10/2002 | Chakraborty et al. |
| 6,466,702 | B1 | 10/2002 | Atkins et al. |
| 6,473,778 | B1 | 10/2002 | Gibbon |
| 6,516,090 | B1 | 2/2003 | Lennon et al. |
| 6,581,096 | B1 | 6/2003 | Cottrille et al. |
| 6,616,700 | B1 | 9/2003 | Thum et al. |
| 6,622,134 | B1 | 9/2003 | Sorkin |
| 6,631,403 | B1 | 10/2003 | Deutsch et al. |
| 6,643,643 | B1 | 11/2003 | Lee et al. |
| 6,643,665 | B2 | 11/2003 | Kimbell et al. |
| 6,658,059 | B1 | 12/2003 | Iu et al. |
| 6,661,468 | B2 | 12/2003 | Alten et al. |
| 6,670,963 | B2 | 12/2003 | Osberger |
| 6,691,106 | B1 | 2/2004 | Sathyanarayan |
| 6,711,587 | B1 | 3/2004 | Dufaux |
| 6,714,909 | B1 | 3/2004 | Gibbon et al. |
| 6,721,454 | B1 | 4/2004 | Qian et al. |
| 6,773,778 | B2 | 8/2004 | Onozawa et al. |
| 6,792,144 | B1 | 9/2004 | Yan et al. |
| 6,807,361 | B1 | 10/2004 | Girgensohn et al. |
| 6,870,956 | B2 | 3/2005 | Qi et al. |
| 6,934,415 | B2 | 8/2005 | Stentiford |
| 6,938,268 | B1 | 8/2005 | Hodge |
| 6,956,573 | B1 | 10/2005 | Bergen et al. |
| 7,006,091 | B2 | 2/2006 | Masera et al. |
| 7,055,166 | B1 | 5/2006 | Logan et al. |
| 7,062,705 | B1 | 6/2006 | Kirkwood et al. |
| 7,065,707 | B2 | 6/2006 | Chen et al. |
| 7,069,310 | B1 | 6/2006 | Bartholomew |
| 7,072,984 | B1 | 7/2006 | Polonsky et al. |
| 7,095,907 | B1 | 8/2006 | Berkner et al. |
| 7,116,716 | B2 | 10/2006 | Ma et al. |
| 7,127,120 | B2 | 10/2006 | Hua et al. |
| 7,248,294 | B2 | 7/2007 | Slatter |
| 7,260,261 | B2 | 8/2007 | Xie et al. |
| 7,274,741 | B2 | 9/2007 | Ma et al. |
| 7,296,168 | B2 | 11/2007 | Edwards |
| 7,325,199 | B1 | 1/2008 | Reid |
| 7,356,464 | B2 | 4/2008 | Stella et al. |
| 7,546,544 | B1 | 6/2009 | Weber et al. |
| 7,603,626 | B2 | 10/2009 | Williams et al. |
| 7,639,882 | B2 | 12/2009 | Itakura |
| 7,824,909 | B2 | 11/2010 | Ching et al. |
| 7,826,709 | B2 * | 11/2010 | Moriya et al. ................ 715/202 |
| 2001/0023450 | A1 | 9/2001 | Chu |
| 2001/0047355 | A1 | 11/2001 | Anwar |
| 2002/0037159 | A1 | 3/2002 | Goto et al. |
| 2002/0067376 | A1 | 6/2002 | Martin et al. |
| 2002/0069218 | A1 | 6/2002 | Sull et al. |
| 2002/0073218 | A1 | 6/2002 | Aspromonte et al. |
| 2002/0100052 | A1 | 7/2002 | Daniels |
| 2002/0116533 | A1 | 8/2002 | Holliman et al. |
| 2002/0154833 | A1 | 10/2002 | Koch et al. |
| 2002/0157116 | A1 | 10/2002 | Jasinschi |
| 2002/0166123 | A1 | 11/2002 | Schrader et al. |
| 2002/0191861 | A1 | 12/2002 | Cheatle |
| 2003/0033347 | A1 | 2/2003 | Bolle et al. |
| 2003/0068087 | A1 | 4/2003 | Wu et al. |
| 2003/0115607 | A1 * | 6/2003 | Morioka et al. ................ 725/61 |
| 2003/0123850 | A1 | 7/2003 | Jun et al. |
| 2003/0152363 | A1 | 8/2003 | Jeannin et al. |
| 2003/0195863 | A1 | 10/2003 | Marsh |
| 2003/0206656 | A1 | 11/2003 | Schwartz et al. |
| 2003/0210886 | A1 | 11/2003 | Li et al. |
| 2003/0237053 | A1 | 12/2003 | Chen et al. |
| 2004/0001106 | A1 | 1/2004 | Deutscher et al. |
| 2004/0039755 | A1 | 2/2004 | Kunze |
| 2004/0039810 | A1 | 2/2004 | Donescu et al. |
| 2004/0040041 | A1 | 2/2004 | Crawford |
| 2004/0068481 | A1 | 4/2004 | Seshadri et al. |
| 2004/0071083 | A1 | 4/2004 | Li et al. |
| 2004/0078357 | A1 | 4/2004 | LaChapelle et al. |
| 2004/0078382 | A1 | 4/2004 | Mercer et al. |
| 2004/0078383 | A1 | 4/2004 | Mercer et al. |
| 2004/0085341 | A1 | 5/2004 | Hua et al. |
| 2004/0086046 | A1 | 5/2004 | Ma et al. |
| 2004/0088726 | A1 | 5/2004 | Ma et al. |
| 2004/0125877 | A1 | 7/2004 | Chang et al. |
| 2004/0128317 | A1 | 7/2004 | Sull et al. |

(56) References Cited

U.S. PATENT DOCUMENTS

| | | | |
|---|---|---|---|
| 2004/0165784 | A1 | 8/2004 | Xie et al. |
| 2004/0184776 | A1* | 9/2004 | Inoue et al. .................. 386/83 |
| 2004/0236863 | A1 | 11/2004 | Shen et al. |
| 2004/0267952 | A1 | 12/2004 | He et al. |
| 2005/0069225 | A1 | 3/2005 | Schneider et al. |
| 2005/0071328 | A1 | 3/2005 | Lawrence |
| 2005/0084232 | A1 | 4/2005 | Herberger et al. |
| 2005/0114434 | A1 | 5/2005 | Yang et al. |
| 2005/0114784 | A1 | 5/2005 | Spring et al. |
| 2005/0162556 | A1 | 7/2005 | Desai |
| 2005/0169312 | A1 | 8/2005 | Cakareski et al. |
| 2005/0175001 | A1 | 8/2005 | Becker Hof et al. |
| 2005/0192987 | A1 | 9/2005 | Marsh |
| 2005/0207442 | A1 | 9/2005 | Zoest et al. |
| 2005/0257151 | A1 | 11/2005 | Wu |
| 2005/0262439 | A1 | 11/2005 | Cameron |
| 2006/0023748 | A1 | 2/2006 | Chandhok et al. |
| 2006/0026528 | A1 | 2/2006 | Paulsen et al. |
| 2006/0036759 | A1 | 2/2006 | Shen et al. |
| 2006/0074754 | A1 | 4/2006 | Toyohara et al. |
| 2006/0107209 | A1 | 5/2006 | Chen et al. |
| 2006/0123053 | A1 | 6/2006 | Scannell |
| 2006/0179054 | A1 | 8/2006 | Levi |
| 2006/0190435 | A1 | 8/2006 | Heidloff et al. |
| 2006/0190615 | A1 | 8/2006 | Panwar et al. |
| 2006/0200442 | A1 | 9/2006 | Parikh |
| 2006/0239644 | A1 | 10/2006 | Barbieri |
| 2007/0027754 | A1 | 2/2007 | Collins et al. |
| 2007/0060099 | A1 | 3/2007 | Ramer et al. |
| 2007/0101387 | A1 | 5/2007 | Hua et al. |
| 2007/0201558 | A1 | 8/2007 | Xu et al. |
| 2008/0065751 | A1 | 3/2008 | Hampson |

FOREIGN PATENT DOCUMENTS

| | | |
|---|---|---|
| EP | 1213915 | 6/2002 |
| EP | 1478181 A1 | 11/2004 |
| GB | 2356080 | 5/2001 |
| JP | 2000516435 | 12/2000 |
| JP | 2001184802 A | 7/2001 |
| JP | 2002125199 A | 4/2002 |
| JP | 2002223412 | 8/2002 |
| JP | 2002238027 | 8/2002 |
| JP | 2004527019 | 9/2004 |
| KR | 20020009089 A | 2/2002 |
| KR | 20030069635 | 8/2003 |
| KR | 20030070480 | 8/2003 |
| KR | 20040042449 A | 5/2004 |
| KR | 100511785 | 8/2005 |
| KR | 20050087654 | 8/2005 |
| WO | WO9855943 | 12/1998 |
| WO | WO0028467 A1 | 5/2000 |

OTHER PUBLICATIONS

U.S. Appl. No. 10/285,933, filed Nov. 1, 2002 inventors Yu-Fei Ma et al. entitled "Systems and Methods for Generating a Motion Attention Mode".

U.S. Appl. No. 10/286,053, filed Nov. 1, 2002 inventors Yu-Fei Ma et al. entitled "Systems and Methods for Generating a Comprehensive User Attention Model".

U.S. Appl. No. 10/286,348, filed Nov. 1, 2002 inventors Xian-Sheng Hua et al. entitled "Systems and Methods for Automatically Editing a Video".

U.S. Appl. No. 10/371,125, filed Feb. 20, 2003 Inventors Wei-Ying Ma et al. Entitled "Systems and Methods for Enhanced Image Adaptation".

Adams, et al., "Seeded Region Growing", IEEE, vol. 16, No. 6, 1994, pp. 641-648.

"Advanced Digital Video Storage and On-line Retrieval System", Advisor Project, Jun. 30, 2002, retrieved from the Internet: http://advisor.matrasi-t1s.fr/DUP_workshop_sheet.pdf.

Ahmad, "VISIT: A Neural Model of Covert Visual Attention" Advances in Neural Information Processing Systems v. 4 1991 pp. 420-427.

Alexander, et al., "Informedia: News-on-Demand Multimedia Information Acquisition and Retrieval", 1997, pp. 1-21.

Baluja et al., "Expectation-Based Selective Attention for Visual Monitoring and Control of a Robot Vehicle" Robotics and Autonomous System v. 22 No. 3-4 Dec. 1997 pp. 329-344.

Beg, "User Feedback Based Enchancement in Web Search Quality", Elsevier Inc., 2004, pp. 20.

Bennett, et al., "Proscenium: A Framework for Spatio-Temporal Video Editing", MM'03, Nov. 2-3, 2003, Berkeley, California, 8 pages.

Bertini et al., "Indexing for Resue of TV News Shots" Pattern Recognition, Elsevier, Kidlington, GB, vol. 35, No. 3, Mar. 2002, pp. 581-591.

Chen et al., "A Visual Attention Model for Adapting Images on Small Displays" ACM Multimedia Systems Journal 2003.

Chen et al., "Function-based Object Model Towards Website Adaptation" (2001) Proc. of the 10th Int. wWW Conf. pp. 1-21.

Cherry, "Pesky Home Networks Trouble cable Behemoths" IEEE Spectrum Apr. 2002 pp. 60-61.

Christopoulos et al., "The JPEG2000 Still Image Coding System: An Overview" IEEE Transactions on Consumer Electronics vol. 46 No. 4 pp. 1103-1127 Nov. 2000.

Degn, et al., "Peer Group Filtering and Perceptual Color Image Quantization", IEEE, 1999, pp. 8.

DeMenthon, et al., "Video Summarization by Curve Simplification", ACM, 1998, pp. 211-218.

Deng et al., "Peer Group Filtering and Perceptual Color Image Quantization" Proceedings of IEEE International Symposium on Circuits and systems vol. 4 1999 pp. 21-24.

Divakaran et al., "Video Summarization Using Descriptors of Motion Activity: A Motion Activity based approach to KeyFrame Extraction from Video Shots" Journal of Electronic Imaging Oct. 2001 vol. 10 n 4 pp. 909-916.

Dufaux, "Key frame selection to represent a video", Proc. 2000 Int. Con. on Image Processing, vol. 2, Sep. 2000, pp. 275-278.

Extended European Search Report mailed Feb. 1, 2012 for European patent application No. 06849037.4, 10 pages.

Ex parte Douglas K. Brubacher and Luciano Passuello, Board Patent Appeals and Interference, Jan. 22, 2009, 14 pages.

Fan, et al., "Visual Attention Based Image Browsing on Mobile Devices", 4 pages.

Foote, et al., "Creating Music Videos using Automatic Media Analysis", 8 pages.

Gamaz et al., "Robust scene-change detection in MPEG compressed domain" Elec & Comp. Eng. pp. 95-99 1998.

Girgensohn, et al., "A Semi-automatic Approach to Home Video Editing", ACM, 2000, pp. 9.

Girgensohn, et al., "Home Video Editing Made Easy—Balancing Automation and User Control", pp. 8.

Goncalves, "Towards a Learning Model for Feature Integration in Attention Control", retrieved on Jul. 19, 2006 at <<http://ieeexplore.ieee.org/search/srchabstract.jsp?arnumber=1013553&isnumber=21824&pun>>, International Conference on Multisensor Fusion and Integration for Intelligent Systems, Aug. 20-22, 2001, pp. 311-316.

Gong, et al., "Creating Motion Video Summaries with Partial Audio-Visual Alignment", IEEE, 2002, pp. 285-288.

Graham, et al., "The Video Paper Multimedia Playback System", Nov. 2-8, 2003, 2 pages.

Gu et al., "Dissolve detection in MPEG compressed video" IEEE pp. 1692-1696 1997.

Hargrove et al., "Logo Detection in Digital Video" Math 100 Mar. 6, 2001 http://toonarchive.com/logo-detection/ 9 pages.

Held, "Focus on Agere System's Orinoco PC Card" International Journal of Network Management Jan. 2002 pp. 187-193.

Heng et al., "Post shot boundary detection technique: Flashlight scene determination" University of Western Australia pp. 447-450 1999.

http://www.fatalfx.com/nomad/ "NOMAD (No More Advertising)" Feb. 17, 2003 4 pages.

(56) References Cited

OTHER PUBLICATIONS

Hua, et al., "Automatically Convering Photographic Series into Video", MM '04, Oct. 10-16, 2004, New York, NY, 8 pages.
Hua, et al., "AVE—Automated Home Video Editing", 2003, ACM, 8 pages.
Hua, et al., "Video Booklet", 4 pages.
Itti et al., A Comparison of Feature Combination Strategies for Saliceny-Based Visual Attention Systesm: Proc. of SPIE Human Vision and Electronic Imaging IV (HVEI'99) San Jose CA vol. 3644 pp. 473-82 Jan. 1999.
Itti et al., "A Model of Saliency-based Visual Attention for Rapid Scene Analysis" IEEE Trans. on Pattern Analysis and Machine Intelligence 1998 5 pages.
Itti et al., "Computational Modelling of Visual Attention" Nature Reviews/Neuroscience vol. 2 Mar. 2001 pp. 1-11.
Jha et al., "Wireless Landscape-Need for Seamless Connectivity" Wireless Personal Communications 2002 pp. 275-283.
Jiang et al., "GnuStream: A P2P Media Streaming System Prototype", 2003 International Conference on Multimedia and Expo, vol. 2 (ICME '03), pp. 325-328.
Jing et al., "An Effective Region-Based Image Retrieval Framework" From ACM Multimedia 2002 28 pages.
Japanese Office Action mailed Feb. 23, 2012 for Japanese patent application No. 2005-224585, a counterpart foreign application of U.S. Pat. No. 7,986,372, 2 pages.
Japanese Office Action mailed Sep. 1, 2011 for Japanese patent application No. 2005-224585, a counterpart foreign application of U.S. Pat. No. 7,986,372, 2 pages.
Kelly, et al., "Implicit Feedback for Inferring User Preference: A Bibliography", SIGIR Forum, vol. 37, No. 2, 2003, pp. 18-28.
Translated Korean Office Action mailed Mar. 17, 2014 for Korean patent application No. 10-2008-7007991, a counterpart foreign application of U.S. Appl. No. 11/279,793, 11 pages.
Translated Korean Office Action mailed Nov. 22, 2012 for Korean patent application No. 10-2008-7015218, a counterpart foreign application of U.S. Pat. No. 7,599,918, 4 page.
Translated Korean Office Action mailed Feb. 14, 2013 for Korean patent application No. 10-2008-7007991, a counterpart foreign application of U.S. Pat. No. 8,180,826, 10 pages.
Translated Korean Office Action mailed Aug. 27, 2013 for Korean patent application No. 10-2008-7007991, a counterpart foreign application of U.S. Pat. No. 8,180,826, 13 pages.
Lee et al., "Automatic Video Parsing Using Shot Boundary Detection and Camera Operation Analysis" Pattern Recognition, Elsevier, Kidlington, GB, vol. 34, No. 3, Mar. 2001, pp. 711-719.
Lee et al., "Perception-Based Image Transcoding for Universal Multimedia Access" School of Electrical Engineering Korea University Seoul Korea 2001 IEEE pp. 475-478.
Lelescu et al., "Real-time scene change detection on compressed multimedia bitstream based on statistical sequential analysis" IEEE pp. 1141-1144 2000.
Li, "PeerStreaming a Practical P2P Streaming System", Microsoft, Sep. 2004.
Li et al., "Statistical Learning of Multi-View Face Detection" Proceedings of ECCV 2002 25 pages.
Lienhart et al., "On the Detection and Recognition of Television Commercials" University of Mannheim 17 pages.
Lin et al., "Video Scene Extraction by Force Competition" IEEE Intl. Conference on Multimedia and Expo (ICME 001) Waseda University Tokyo Japan Aug. 22-25, 2001 4 pages.
Lu et al., "A Robust Audio Classification and Segmentation Method" Microsoft Research China 9 pages.
Lu et al., "Content Analysis for Audio Classification and Segmentation" IEEE Transactions on Speech and Audion Processing vol. 10 No. 7 Oct. 2002 pp. 504-516.
Lu et al., "Content-Based Audio Segmentation Using Support Vector Machines" 2001 IEEE pp. 956-959.
Ma et al., "A Model of Motion Attention for Video Skimming" Microsoft Research Asia 4 pages.

Ma et al., "A New Perceived Motion Based Shot Content Representation" Microsoft Research China 4 pages.
Ma et al., "A User Attention Model for Video Summarization" Proceedings of ICIP 2002.
Milanese et al., "Attentive Mechanisms for Dynamic and Static Scene Analysis" Optical Engineering v34 No. 8 Aug. 1995 pp. 2428-2434.
Niebur et al., "Computational Architectures for Attention" The Attentive Brain Chapter 9 1998 pp. 163-186.
"NOMAD (No More Advertising)", retrieved on Jun. 28, 2004, at <<http://www.fatalfx.com/nomad/>>, pp. 4.
"An MPEG-1 shot boundary detector using XIL colour histograms" Dublin City University pp. 1-7 1998.
O'Toole et al., "Evaluation of Automatic Shot Boundary Detection on a Large Video Test Suite" School of Computer Applications & School of Electronic Engineering Dublin City University Glasnevin Dublin Ireland Challenge of Image Retrieval Newcastle 1999 pp. 1-12.
Office Action for U.S. Appl. No. 11/263,718, mailed on Sep. 8, 2011, Xian-Sheng Hua, "Template-Based Multimedia Authoring and Sharing ", 7 pgs.
Office Action for U.S. Appl. No. 10/900,923, mailed on Sep. 26, 2013, DeYonker, et al., "Thumbnail Generation and Presentation for Recorded TV Programs", 20 pages.
Office Action for U.S. Appl. No. 10/900,923, mailed on Apr. 9, 2014, DeYonker et al., "Thumbnail Generation and Presentation for Recorded TV Programs", 7 pages.
Final Office Action for U.S. Appl. No. 11/278,487, mailed on Jun. 16, 2011, Yu-Fei Ma, "Generating a Motion Attention Model".
Non-Final Office Action for U.S. Appl. No. 11/279,793, mailed by Sep. 15, 2011, Xian-Sheng Hua, "Media Sharing and Authoring on the Web", 21 pages.
Final Office Action for U.S. Appl. No. 10/900,923, mailed on Sep. 22, 2011, Aaron DeYonker, "Thumbnail Generation and Presentation for Recorded TV Programs", 21 pages.
Osberger, et al., "An Automatic Image Quality Assessment Technique Incorporating Higher Level Perceptual Factors", retrieved on Jul. 19, 2006, at <<http://ieeexplore.ieee.org/search/srchabstract.jsp?arnumber727227&isnumber==15680&punu>>, International Conference on Image Processing, vol. 3, Oct. 4-7, 1998, pp. 414-418.
Padmanabhan et al., "Resilient Peer to Peer Streaming", <<http://eprints.kfupm.edu.sa/62381.pdf>>, Mar. 2003., 17 pages.
Pirolli, "Exploring Browser Design Trade-offs Using a Dynamical Model of Optimal Information Foraging", Proc. SIGHI Conference on Human factors in Computing Systems CHI, 1998, pp. 33-40.
Rauschenbach, et al., "Demand-driven image transmission with levels of detail and regions of interest", Computers & Graphics, 1999, pp. 857-866.
Rauschenbach, et al., "Flexible Embedded Image Communication using Levels of Detail and Regions of Interest", Proc. IMC'98, 1998, pp. 1-10.
Sadlier, "Automatic TV Advertisement Detection from Mpeg Bitstream" Centre for Ditial Video Processing/Research Institute for Network & Communication Eng. Dublin City University 12 pages.
Sahoo et al., "Threshold Selection Using a Minimal Histogram Entropy Difference" Optical Engineering v36 No. 7 Jul. 1997 pp. 1976-1981.
Sanchez et al., "AudiCom: a Video Analysis System for Auditing Commercial Broadcasts" Computer Vision Center Departament d'Informatica Universitat Autonoma de Barcelona 5 pages.
Shen, et al., "Implicit User Modeling for Personalized Search", Proceedings of teh 14th ACM International Conference on Information and Knowledge Management, ICKM, Oct. 31, 2005, pp. 824-831, retrieved from the internet at http://dl.acm.org/citation.cfm?doid=1099554.1099747 on Jan. 19, 2012.
Smith, et al., "Scalable Multimedia Delivery for Pervasive Computing", ACM, 1999, pp. 131-140.
Smith et al., "Video Skimming and Characterization through the Combination of Image and Language Understanding Techniques" Proc. of Computer Vision and Pattern Recognition 1997 IEEE pp. 775-781.
Sugiyama, et al., "Adaptive Web Search Based on User s Implicit Preference", DEWS, 2004, pp. 8.

(56) References Cited

OTHER PUBLICATIONS

Tsotsos et al., "Modeling Visual Attention Via Selective Tuning" Artificial Intelligence v78 1995 pp. 507-545.

Uchihashi et al., "Video Manga: Generating Semantically Meaningful Video Summaries", in Proceedings of the Seventh ACM International Conference on Multimedia, Orland Florida, Oct. 30-Nov. 5, 1999, ACM, pp. 383-392.

Vetro, et al., "Object-Based Transcoding for Adaptable Video Content Delivery", Transactions on Circuits and Systems for Video Technology, IEEE, vol. 11, No. 3, Mar. 2001, pp. 387-401.

Wang, "Design and Realization of User Model of Personalized Information Retrieval", Masteral Dissertation, Dalian University of Science and Technology, Dec. 15, 2004, pp. 10-75.

Wolf, "Key Frame Selection by Motion Analysis", Conf. Proceedings Acoustics, Speech, and Signal Processing, 1996 IEEE International Conference, May 1996, vol. 2, pp. 1228-1231.

Wolfe et al., "Deploying Visual Attention: The Guided Search Model," AI and the Eye, Chapter 4, 1990, pp. 79-103.

Yeo et al., "Rapid scene analysis on compressed video" IEEE pp. 533544 1995.

Yip, et al., "The Automatic Video Editor", Nov. 2-8, 2003, Berkeley, California, 2 pages.

Yusoff et al., "Video shot cut detection using adaptive thresholding" University of Surrey pp. 1-10 2000.

Zabih, "A Feature-Based Algorithm for Detecting and Classifying Scene Breaks" Computer Science Department Cornell University 16 pages.

Zadeh, "Probability Measures of Fuzzy Events" Journal of Mathematical Analysis and Applications 23 1968 pp. 421-427.

Zhang et al., "A Hierarchical Organization Scheme for Video Data" Pattern Recognition, Elsevier, Kidlington, GB, vol. 35 No. 11, Nov. 2002, pp. 2381-2387.

Zhuang et al., "Adaptive Key Frame Extraction Using Unsupervised Clustering", Oct. 1998 in IEEE International Conference on Image Processing, vol. 1, pp. 866-870.

Japanese Office Action mailed Aug. 12, 2008 for Japanese patent application No. 2003-375,014, 10 pages.

Office action for U.S. Appl. No. 10/900,923, mailed on Oct. 29, 2008, DeYonker et al., "Thumbnail Generation and Presentation for Recorded TV Programs", 24 pages.

Office action for U.S. Appl. No. 10/900,923, mailed on Nov. 25, 2009, DeYonker et al., "Thumbnail Generation and Presentation for Recorded TV Programs", 25 pages.

Office action for U.S. Appl. No. 10/900,923, mailed on Mar. 18, 2008, DeYonker et al., "Thumbnail Generation and Presentation for Recorded TV Programs", 52 pages.

Office action for U.S. Appl. No. 10/900,923, mailed on Mar. 25, 2011, DeYonker et al., "Thumbnail Generation and Presentation for Recorded TV Programs", 24 pages.

Office action for U.S. Appl. No. 10/900,923, mailed on May 12, 2009, DeYonker et al., "Thumbnail Generation and Presentation for Recorded TV Programs", 25 pages.

Office action for U.S. Appl. No. 10/900,923, mailed on Jun. 24, 2010, DeYonker et al., "Thumbnail Generation and Presentation for Recorded TV Programs", 23 pages.

\* cited by examiner

| | 202 | 204 | 206 | 208 | 210 |
|---|---|---|---|---|---|
| | THUMBNAIL ID | TV ID | PROGRAM TITLE | RATING | SHOW THUMB. |
| 220(1) | 00032.TMP | 31456 | CSI: MIAMI | TV 14 | NO |
| | : | : | : | : | : |
| 220(N) | 04520.PMT | 63290 | RUGRATS | ALL | YES |

Fig. 2

THUMBNAIL GENERATION AND PRESENTATION FOR RECORDED TV PROGRAMS

RELATED APPLICATIONS

This application claims priority to and is a continuation of U.S. patent application Ser. No. 10/900,923, filed on Jul. 28, 2004, the entire contents of which are incorporated herein by reference.

TECHNICAL FIELD

The present invention generally relates to TV recording systems, and more particularly, to ways to generate and present thumbnails derived from recorded TV programs.

BACKGROUND

With the convergence of home entertainment technologies, there are a growing number of devices that store many different forms of content, such as music, movies, pictures, TV programs, videos, games, and so forth. Devices like digital video recorders (DVRs), game consoles, and entertainment-configured computers (e.g., computers that run the Windows® XP Media Center operating system from Microsoft Corporation) enable users to record, manage, and playback many different forms of content. Even less featured devices, such as set-top boxes, can be designed to record multiple types of content.

As such devices are configured to store more content and offer more functionality, the ability to present the various forms of recorded content in a cohesive, understandable, and user-friendly manner continues to be a challenge. This is particularly true for recorded TV programs. Traditionally, home entertainment devices have simply provided a title or other text identifier of recorded TV programs. It would be useful if other techniques for identifying and navigating recorded TV programs were developed.

SUMMARY

Thumbnail images representative of recorded TV programs are generated and presented to aid a user in browsing the recorded TV programs. In one implementation, a temporary thumbnail image is generated when a TV program first starts recording. The temporary thumbnail is used to populate quickly any user interface (UI) screens that reference the TV program, even as the program is recording. Once the TV program has reached a threshold amount of recording (e.g., a prescribed duration of recording or completion of the recording), a permanent thumbnail image is generated and associated with the TV program. The permanent thumbnail is then presented in any subsequent UI screens that reference the TV program, replacing the temporary thumbnail. The user can navigate among the thumbnail images presented in the various UI screens and select a particular recorded TV program by choosing the corresponding thumbnail image. According to another implementation, display of the thumbnail images within the UI screens may be further controlled by preference settings, such as parental controls.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 2 illustrates a data structure used by the client device of FIG. 1 to associate thumbnail images with corresponding TV programs.

DETAILED DESCRIPTION

The following disclosure describes techniques for generating and presenting thumbnail images that are representative of recorded TV programs. The thumbnail images, or simply "thumbnails", are created from actual video content of the TV programs and hence, are visually descriptive of the recorded programs. The thumbnail images are presented in a user interface to assist a viewer in browsing among the recorded TV programs and selecting a particular recorded TV program.

The following discussion is directed generally to entertainment systems, and particularly to television-based systems, such as broadcast TV systems, interactive TV systems, cable TV systems, and Web-enabled TV systems. While aspects of the described systems and methods can be implemented in any number of television-enabled entertainment systems, and within any number and types of client devices, the systems and methods are described in the context of the following exemplary system.

Figure 1:
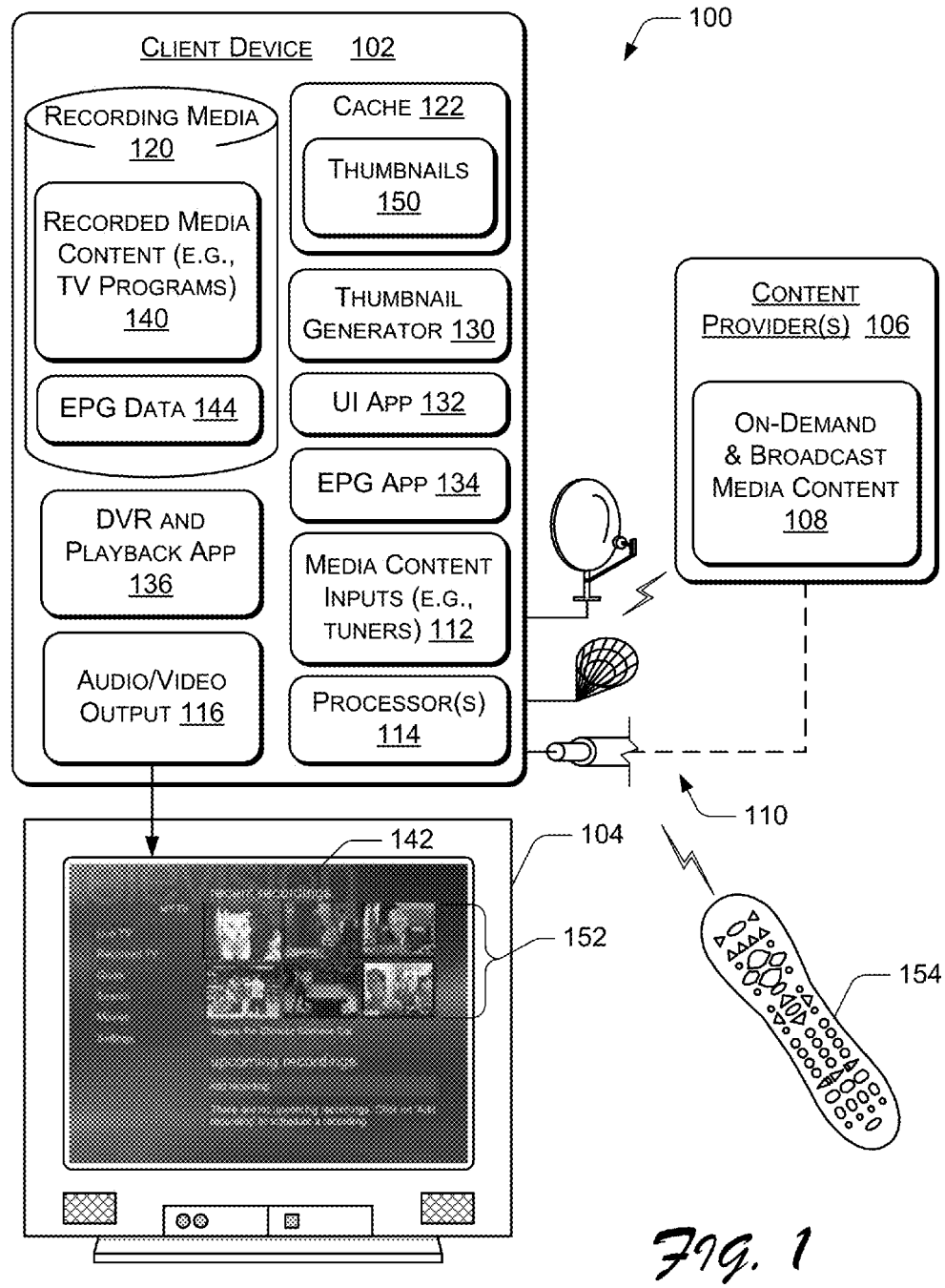
FIG. 1 illustrates a system in which TV content is delivered from a content provider to a client device and recorded for subsequent playback. The system represents an exemplary environment in which thumbnail generation and presentation for recorded TV programs can be implemented.

FIG. 1 illustrates an exemplary system 100 for recording TV programs and generating representative thumbnails for purposes of browsing the recorded TV programs. System 100 includes a client device 102, a display 104 (e.g., television, monitor, etc.), and one or more content providers 106. The content providers 106 control distribution of on-demand and/or broadcast media content 108, such as movies, TV programs, commercials, music, and similar audio, video, and/or image content. Content providers 106 are representative of satellite operators, network television operators, cable operators, Web-based content providers, and the like.

The client device 102 receives and stores the media content 108 distributed by the content providers 106. In particular, the client device 102 is configured to receive and record TV programs broadcast or otherwise transmitted by the content providers 106. Examples of TV programs include news, sitcoms, comedies, TV movies, infomercials, talk shows, sporting events, and so on. The client device 102 can be implemented in many ways, including as a TV-enabled computer, a computer-based media server, a set-top box, a satellite receiver, a TV recorder with a hard disk, a digital video recorder (DVR), a game console, an information appliance, and so forth.

The client device 102 receives the media content 108 via various transmission media 110, such as satellite transmission, radio frequency transmission, cable transmission, and/or via any number of other transmission media, such as a file transfer protocol over a network (e.g., Internet or Intranet) and/or data packet communication. The client device 102 includes one or more media content inputs 112, which may include tuners that can be tuned to various frequencies or channels to receive television signals and/or Internet Protocol (IP) inputs over which streams of media content are received via an IP-based network.

The client device 102 also includes one or more processors 114 which process various instructions to control operation of client device 102, to execute applications stored on the client device, and to communicate with other electronic and computing devices. The processors 114 may further include a content processor to receive, process, and decode media content and program data. The client device 102 is also equipped with an audio/video output 116 that provides audio and video data to the display 104, or to other devices that process and/or display, or otherwise render, the audio and video data. Video and audio signals can be communicated from the client device 102 to the display 104 via an RF (radio frequency) link, S-video link, composite video link, component video link, analog audio connection, or other similar communication links.

The client device 102 is equipped with different types of memory components, including both volatile and non-volatile memory. In this example, the client device 102 has a recording media 120 and a cache 122. The recording media 120 may be implemented in many ways using various non-volatile storage media, such as hard disk drives, RAID systems, recordable and/or rewritable discs, and so forth. Cache 122 can be implemented, for example, as random access memory (RAM) for faster access during data processing in client device 102. Although not shown, the client device may further include one or more data memory components as well as a program memory to store applications.

One or more application programs can be stored in program memory and executed by the processor(s) 114. Representative applications shown in FIG. 1 include a thumbnail generator 130, a user interface (UI) application 132, an electronic program guide (EPG) application 134, and a DVR and playback application 136. An operating system (not shown) may also be maintained in storage and executed on processor(s) 114.

The DVR and playback application 136 records media content received from the content providers 106 in the recording media 120. The recorded media content 140 includes TV programs that a viewer has recorded to watch at a later time. The DVR and playback application 136 also facilitates playback of the recorded media content 140 on the display 104.

The UI application 132 allows a user to browse and select content recorded on the client device 102. The UI application 132 supports interactive and graphical UI screens that identify the media content 140 stored in the recording media 120 and offer options for handling the media content 140 in some manner. For example, the UI screens might enable navigation to various recorded content (e.g., audio, still images, video, TV programs, etc.), list recently recoded content, or provide detailed information on specific content. One exemplary UI screen 142 is depicted on the display 104. This UI screen 142 shows the most recently recorded TV programs.

The EPG application 134 generates a program guide for presentation on the display 104. The program guide includes a schedule indicating when particular content will be broadcast for viewing and on which channel the content will be broadcast. The EPG application 134 enables a viewer to navigate through the program guide and locate broadcast programs, recorded programs, video on-demand programs and movies, interactive game selections, and other media access information or content of interest to the viewer. EPG data 144 is downloaded from the content providers 106 and stored in recording media 120, where it is accessed by the EPG application 134 to populate the program guide.

The thumbnail generator 130 creates thumbnail images 150 representative of the recorded TV programs and stores the thumbnail images 150 in the cache 122. The thumbnail images, or just "thumbnails", are derived from the actual video content of the TV programs and are used by the UI application 132 and/or the EPG application 134 to visually represent the recorded TV programs in the UI screens. By storing the thumbnails 150 in the cache 122, the thumbnails 150 are available for immediate retrieval to populate the appropriate UI screens. The thumbnails 150 may alternatively, or additionally, be stored in other memory, such as the recording media 120.

In FIG. 1, the UI screen 142 shows six thumbnail images 152 created from recorded TV programs stored in the recording media 120. The thumbnails show representative video frames from related TV programs so that the viewer will visually associate a stored program with the depicted thumbnail. The viewer can then navigate the screen 142 using an input device, such as remote control handset 154, to browse among the thumbnails as a way to ascertain what TV programs are recorded on the recording media 120. With the handset 154, the viewer can select a thumbnail to cause the client device 102 (and namely, the DVR and playback application 136) to playback the recorded TV program associated with the thumbnail.

According to one implementation, the thumbnail generator 130 is configured to create two thumbnails as the TV program is being recorded. A temporary thumbnail is derived when the TV program first begins recording. In one implementation, the temporary thumbnail is derived from a video frame extracted from a beginning portion of the TV program. For instance, the thumbnail generator 130 selects the first non-black video frame in the TV program from which to derive the temporary thumbnail. In this manner, the thumbnail image is generated within seconds and is available for immediate display in a UI screen as soon as the TV program begins recording.

A permanent thumbnail is subsequently generated when more of the TV program has been recorded. The permanent thumbnail is generated using video detection techniques which rely on analysis of a larger portion of the TV program. Such analysis might include, for example, avoidance of a black frame, avoidance of any frames associated with a commercial, avoidance of padding, scene analysis, examination of program metadata, and so forth. One example of a suitable technique for isolating and deriving thumbnail candidates from a recorded video program is disclosed in U.S. Pat. No. 7,986,372, entitled "Systems and Methods for Smart Media Content Thumbnail Extraction", which is assigned to Microsoft Corporation. The video detection techniques may be performed on the program after a predetermined amount is recorded (e.g., 15 minutes, 30 minutes, etc.) or after the entire program is recorded.

The thumbnail created from the TV program can be static or dynamic. A static thumbnail contains a still image generated from the video content. A dynamic thumbnail consists of multiple images generated from the TV program, which are then played in a continuous loop so that the thumbnail appears animated.

The temporary and permanent thumbnails 150 are stored in the cache 122 in association with corresponding TV programs so that when the UI application 132 and/or the EPG application 134 display information about a particular TV program, the corresponding thumbnail is retrieved from the cache 122 and presented in a UI screen. One way to associate the thumbnails with the TV programs is via a data structure stored in memory, such as program or data memory.

FIG. 2 shows one example data structure 200 used to associate the thumbnail images 150 with the corresponding TV programs stored in recording media 120. The data structure 200 includes multiple data fields that hold and correlate information for each record entry. In this example, the data fields include a thumbnail identifier field 202, a TV identifier field 204, a program title field 206, a rating field 208, and a show thumbnail field 210. It is noted that more or less fields may used in such a data structure, and that the illustrated structure is just one example.

Multiple entries 220(1)-220(N) are shown in the data structure 200. Each entry contains information pertaining to a TV program. Here, entry 220(1) is for a TV program titled "CSI: Miami", which has an identifier of "31456" and a content rating of "TV 14". This TV program is associated with a temporary thumbnail identified as "00032.TMP". Entry 220(1) is an example of a TV program that has just started recording, and hence has a temporary thumbnail associated therewith.

Another entry 220(N) is for a TV program titled "Rugrats", which has an identifier of "63290" and a content rating of "All". This TV program is associated with a permanent thumbnail identified as "04520.PMT". Entry 220(N) is an example of a TV program that has been recording a sufficient amount of time (or has been completely recorded), and hence has a permanent thumbnail associated therewith.

An aspect of the described system is that the thumbnail images generated from the TV programs may or may not be displayed based on preferences established by the viewer. For instance, suppose a parent has established parental controls that prevent display of programs with a TV14 or higher rating at certain times of operation, or on certain displays viewed by younger viewers in the home. In this case, the parent would most likely prefer not to have a thumbnail image of the corresponding content displayed in various UI menus or listings. Accordingly, the show thumbnail field 210 dictates when a thumbnail should be displayed based on the rating provided in the rating field 208. In this example, if the rating is TV14 or higher, as is the case for the TV program "CSI: Miami" at entry 220(1), the entry contains a "No" data item in the show thumbnail field 210 to indicate that the associated thumbnail should not be shown. The thumbnail image can be replaced with a blank image, a logo of the TV rating, an icon, or other form of generic image. If the rating is less than TV14, as is the case for the TV program "Rugrats" at entry 220(N), a "Yes" data item is in the show thumbnail field 210 to indicate that the associated thumbnail can be shown.

In another implementation, the determination of whether to display a thumbnail based on viewer preferences may be made without maintaining a flag designator in show thumbnail field 210 for each associated recorded program (thereby eliminating the use of field 210 in data structure 200). In this alternate implementation, preferences are maintained in a separate memory location and the determination is made by dynamically comparing the rating of the recorded show against the current preferences to decide whether to depict the thumbnail at the time the thumbnail is to be displayed. In this manner, if the preferences are changed at anytime, the change is made quickly in this single memory location rather than updating every flag designator in the sow thumbnail field 210 for all recorded programs.

Figure 3:
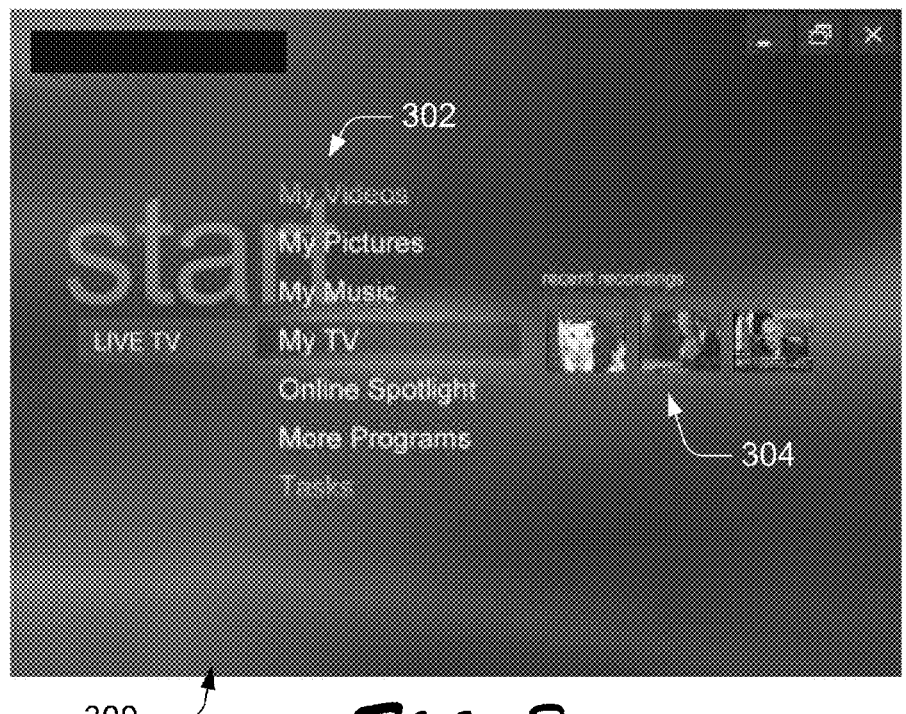
FIG. 3 shows a "Start" graphical UI screen that is presented when a viewer wishes to access various forms of content on the client device of FIG. 1.

FIGS. 3-6 show various examples of UI screens that depict the temporary and/or permanent thumbnail images. FIG. 3 shows a "Start" UI screen 300, which is initially presented to a viewer when accessing various forms of content stored on the client device 102. In this example, the UI screen 300 has a menu 302 of different types of content the viewer might wish to access, including videos, pictures, music, TV, and other content. Adjacent the menu 302 are three thumbnail images 304 that are associated with the three most recently recorded TV programs. These thumbnails 304 may be temporary or permanent, depending upon how much of the corresponding program has been recorded. As an example, the first thumbnail depicting a cartoon cat could be a temporary thumbnail derived from the first few frames of a cartoon that the client device 102 has just started recording. The second and third thumbnails might represent permanent thumbnails generated from TV programs that have already been recorded. It is noted that as more of the cartoon is recorded, a permanent thumbnail image will be generated and later replace the temporary thumbnail image on the "Start" UI screen 300.

Figure 4:
FIG. 4 shows a "My TV" graphical UI screen that is presented upon selection of a menu item in the "Start" graphical UI screen of FIG. 3.

FIG. 4 shows a "My TV" UI screen 400, which is presented upon selection of the "My TV" item in menu 302 of the "Start" UI screen 300 (FIG. 3). The "My TV" UI screen 400 has a menu 402 of operational choices for the viewer, including a listing of live TV programs currently playing, a listing of recorded TV programs stored on the device 102, a program guide, a search feature, a listing of movie selections, and operational settings. A set of six thumbnail images 404 representing the six most recently recorded TV programs are also depicted on the UI screen 400. These thumbnails 404 may include temporary thumbnails and/or permanent thumbnails.

Figure 5:
FIG. 5 shows a "Recorded TV" graphical UI screen that is presented upon selection of a menu item in the "My TV" graphical UI screen of FIG. 4.

FIG. 5 shows a "Recorded TV" UI screen 500, which is presented upon selection of the "Recorded TV" item in menu 402 of the "My TV" UI screen 400 (FIG. 4). The "Recorded TV" UI screen 500 has a menu 502 of operational choices to sort the recorded TV programs by date or by name, to add a recording, schedule a recording, or create a CD/DVD of the recorded program. To the right of the menu 502 is a listing 504 of recorded TV programs represented by the associated thumbnail image, a program title, and the date/time it was recorded. Once again, the thumbnails used in this listing 504 may include temporary thumbnails and/or permanent thumbnails.

Figure 6:
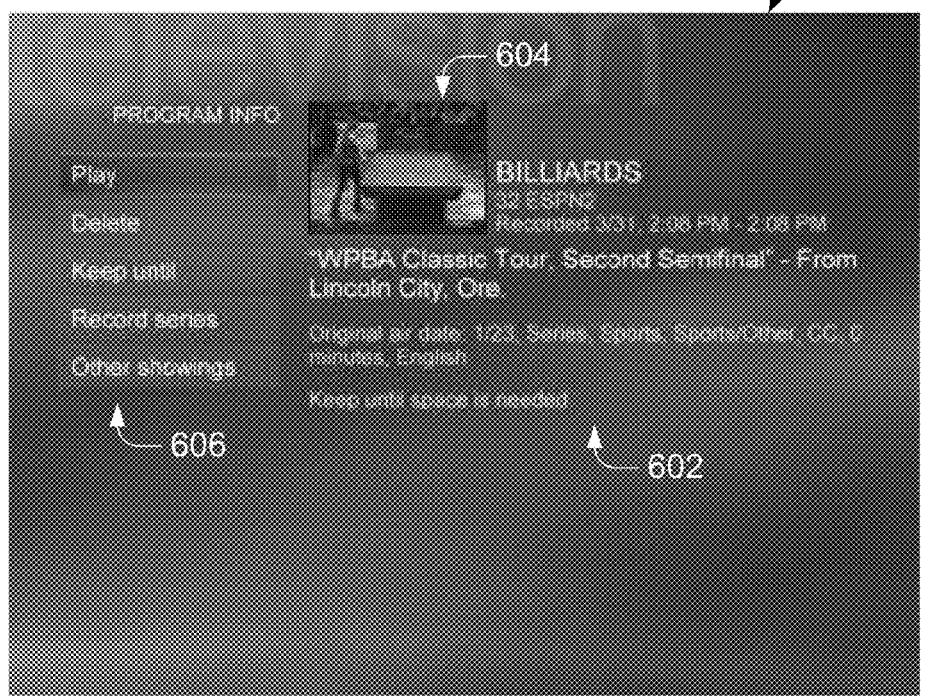
FIG. 6 shows a "Program Info" graphical UI screen that is presented upon selection of a particular program listed in the "Recorded TV" graphical UI screen of FIG. 5.

FIG. 6 shows a "Program Info" UI screen 600, which is presented upon selection of a particular program in listing 504 of the "Recorded TV" UI screen 500 (FIG. 5). The "Program Info" UI screen 600 shows more detailed information 602 on a selected program, such as the program title, a brief description, when it was recorded and from which channel, and so forth. Included with this detailed information is a thumbnail image 604 to visually convey a sample of the content in the TV program. The thumbnail 604 may be temporary at first, but is later replaced with a permanent thumbnail when a sufficient amount of the program has been recorded. The "Program Info" UI screen 600 also has a menu 606 of operational choices to play the program, delete the program, set a "keep until" date for maintaining the program, and record a series of programs.

Figure 7:
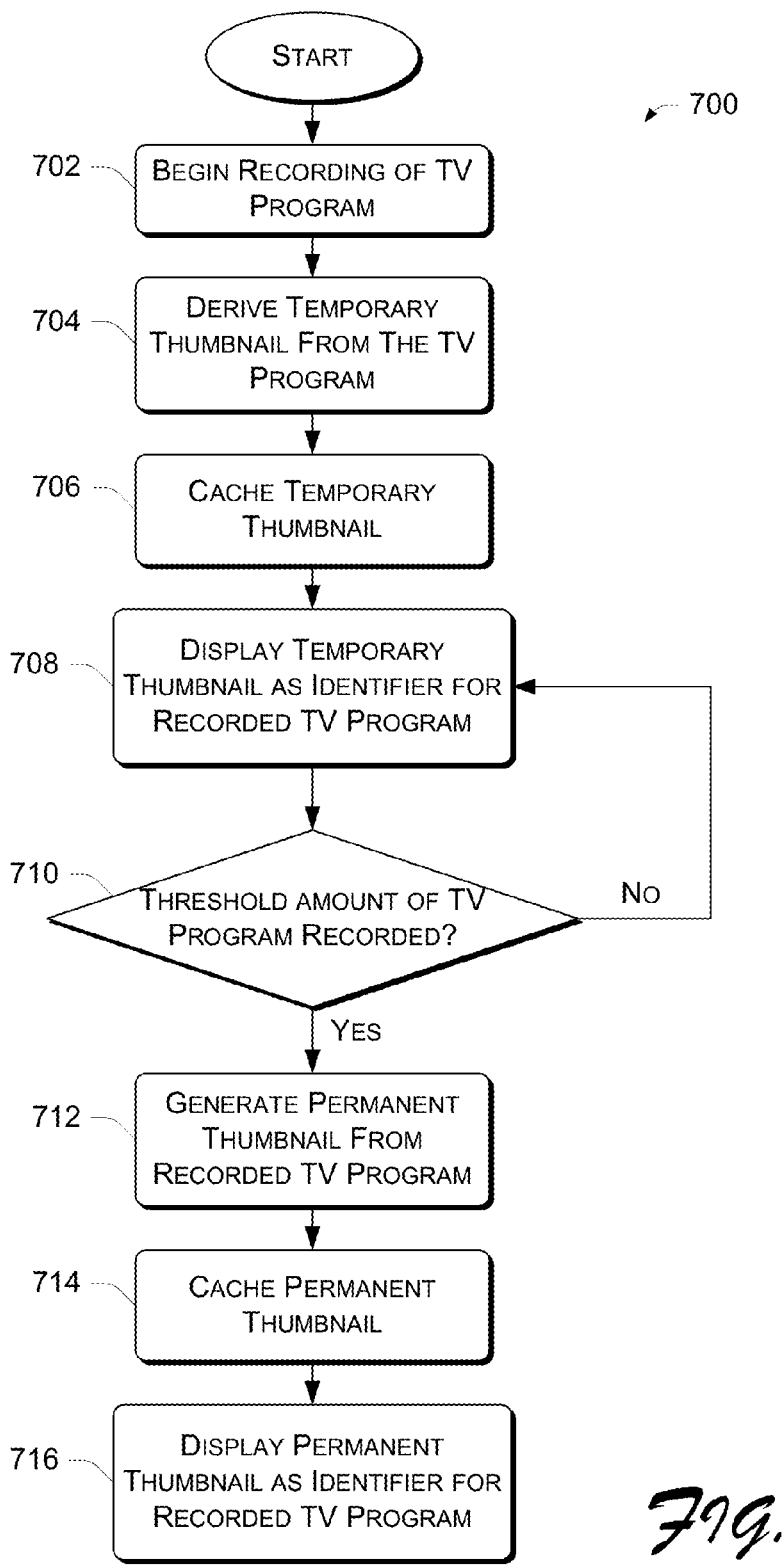
FIG. 7 shows a process for generating and presenting thumbnail images in conjunction with recorded TV programs.

FIG. 7 shows a process 700 for generating and presenting thumbnail images in conjunction with recorded TV programs. The process 700 is illustrated as a collection of blocks in a logical flow graph, which represent a sequence of operations that can be implemented in hardware, software, firmware, or any combination thereof. In the context of software and/or firmware, the blocks represent computer instructions that, when executed by one or more processors, perform the recited operations.

For discussion purposes, the process 700 is described with reference to the system 100 described above with respect to FIG. 1. It is noted that the process 700 may be implemented by other types of systems that are designed to record and playback TV programs.

At block 702, the client device 102 begins recording a TV program. During this initial recording, the thumbnail generator 130 derives a temporary thumbnail image representative of the TV program (block 704). This temporary thumbnail is quickly created, for example, from the beginning portion of the TV program. The derivation involves at least minimum logic to ensure that the thumbnail generator 130 avoids extracting a black frame. Thus, the thumbnail generator 130 might be configured to extract the first non-black frame from the TV program and derive a thumbnail image from that frame.

At block 706, the temporary thumbnail image is stored in the cache 122. At block 708, the temporary thumbnail is displayed as part of any UI screens that identify recorded TV programs, such as the example UI screens 300, 400, 500, and 600 (FIGS. 3-6). As the program continues recording, a permanent thumbnail is generated from the recorded content. To ensure that a highly representative thumbnail is created, a larger portion of the recorded program is analyzed.

Accordingly, decision block 710 determines whether a threshold amount of the TV program has been recorded. This threshold amount may be measured in number of frames, duration, or other ways. For instance, the client device 102 may be configured to begin generating a permanent thumbnail after 1000 frames have been recorded, or after 15 minutes of the program has been recorded, or alternatively after the entire program has been recorded. If a sufficient portion of the TV program has not yet been recorded (i.e., the "No" branch from block 710), the client device 102 continues to use the temporary thumbnail in the cache 122.

Alternatively, if a sufficient portion of the TV program has been recorded (i.e., the "Yes" branch from block 710), the thumbnail generator 130 generates a permanent thumbnail representative of the recorded TV program (block 712). The thumbnail generator 130 uses video detection techniques to generate the image. It analyzes the frames of the recorded program, relying on significant logic to avoid black frames and frames from commercials, to ignore pre-padding and post-padding, to consider head shots, and use program metadata (e.g. category/genre). Once the frames are analyzed, a representative video frame is selected and the thumbnail image is derived from that selected frame.

At block 714, the permanent thumbnail image is stored in the cache 122. The permanent thumbnail can be stored over the temporary thumbnail, thereby deleting the temporary thumbnail from the cache, or alternatively, stored in addition to the temporary thumbnail. In any event, at block 716, the permanent thumbnail is displayed as part of any UI screens that identify recorded TV programs, such as the example UI screens 300, 400, 500, and 600 (FIGS. 3-6), thereby replacing the temporary thumbnail in such UI screens.

Figure 8:
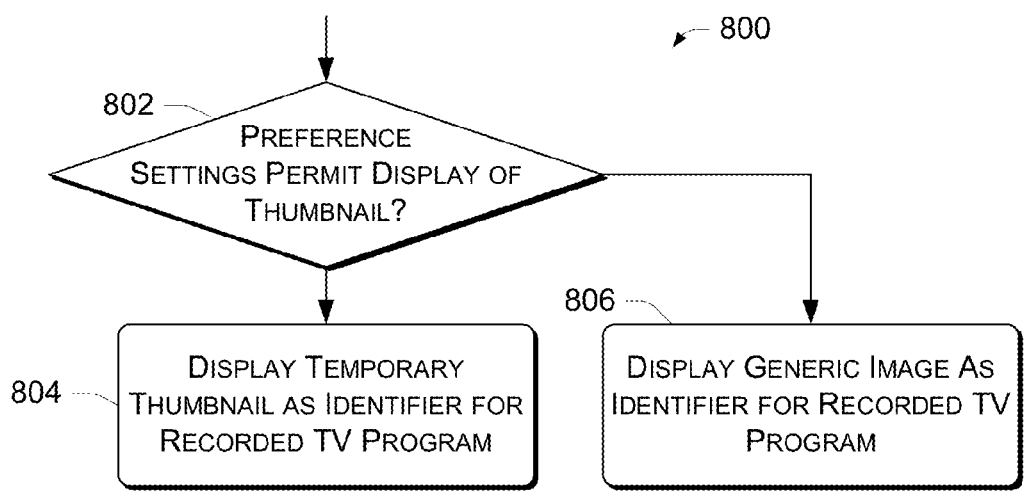
FIG. 8 shows a process for controlling display of the thumbnail images based on user preference settings.

FIG. 8 shows a process 800 for controlling display of the thumbnail images based on parental control or other user preference settings. At block 802, the client device 102 determines whether preference settings, such as parental controls, permits display of the thumbnail images. If permitted (i.e., the "Yes" branch from block 802), the client device 102 displays the thumbnails (temporary or permanent) within the UI screens as identifiers for the recorded TV program (block 804). Conversely, if not permitted (i.e., the "Yes" branch from block 802), the client device 102 displays some other generic image in place of the thumbnail (block 806) or, alternatively, foregoes altogether any display of another image.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   recording, at a client device, media content;
   generating from the media content, during an initial recording of the media content and before a recorded portion of the media content exceeds a threshold portion of the media content, a temporary thumbnail representative of the media content from a frame in the media content;
   presenting, by the client device, the temporary thumbnail within an electronic program guide (EPG) listing;
   determining, by the client device, that the recorded portion of the media content exceeds the threshold portion of the media content;
   generating from the recorded portion of the media content, a permanent thumbnail representative of the recorded portion of the media content based at least in part on selecting a representative frame in the recorded portion of the media content; and
   presenting, by the client device, the permanent thumbnail within the EPG listing instead of the temporary thumbnail.

2. A method as claim 1 recites, further comprising selecting the representative frame based at least in part on a scene analysis of the recorded portion of the media content.

3. A method as claim 1 recites, wherein the generating the temporary thumbnail is based at least in part on selecting a particular frame in a beginning portion of the media content.

4. A method as claim 1 recites, wherein the frame and the representative frame are different frames of the media content.

5. A method as claim 1 recites, further comprising presenting a plurality of thumbnails within the EPG listing that correspond to a plurality of media contents that are at least partially recorded.

6. A method as claim 1 recites, further comprising caching at least one of the temporary thumbnail or the permanent thumbnail.

7. A method as claim 1 recites, wherein at least one of the temporary thumbnail or the permanent thumbnail is dynamic.

8. A method as claim 1 recites, further comprising:
   associating the temporary thumbnail and the permanent thumbnail with a content rating that is subject to a preference setting;
   presenting the temporary thumbnail and the permanent thumbnail in an event that the preference setting for the associated content rating permits viewing; and
   preventing presentation of the temporary thumbnail and the permanent thumbnail in an event that the preference setting for the associated content rating does not permit viewing.

9. A method as claim 3 recites, wherein the particular frame is a first non-black frame in the media content.

10. A method as claim 5 recites, further comprising enabling a user to browse the plurality of media contents that are at least partially recorded by navigating the plurality of thumbnails.

11. A computer storage device comprising computer-executable instructions that, when executed, direct the computer storage device to:
generate, during an initial recording of media content, a temporary thumbnail representative of the media content from a frame in a first portion of recoded media content;
present the temporary thumbnail within an electronic program guide (EPG) user interface as an identifier of the media content;
determine that the recorded media content exceeds a threshold portion of the media content;
generate a permanent thumbnail that is representative of the recorded media content based at least in part on selecting a representative frame in a second portion of the recorded media content; and
present the permanent thumbnail within the EPG listing instead of the temporary thumbnail as the identifier of the media content.

12. A computer storage device as claim 11 recites wherein the first portion of recoded media content and the second portion of the recoded media content are different portions of the recorded media content.

13. A computer storage device as claim 11 recites, further comprising computer-executable instructions that, when executed, direct the computer storage device to:
present a plurality of thumbnails within the EPG user interface that correspond to a plurality of media contents; and
enable a user to browse the plurality of media contents by navigating the plurality of thumbnails.

14. A computer storage device as claim 11 recites, further comprising computer-executable instructions that, when executed, direct the computer storage device to cache at least one of the temporary thumbnail or the permanent thumbnail.

15. A computer storage device as claim 11 recites, further comprising computer-executable instructions that, when executed, direct the computer storage device to:
associate the temporary thumbnail and the permanent thumbnail with a content rating that is subject to a preference setting; and
prevent presentation of the temporary thumbnail and the permanent thumbnail in an event that the preference setting for the associated content rating does not permit viewing.

16. A device comprising:
a memory device to store the media content;
a processor; and
the computer storage device as claim 11 recites, operatively coupled to the processor so that when the processor executes the computer-executable instructions, the device generates the temporary thumbnail and the permanent thumbnail from the recorded portion of the media content stored in the memory device.

17. A device comprising:
a recorder to record media content onto a recording medium; and
a thumbnail generator to:
form a temporary thumbnail representative of the media content from a frame in a first portion of recoded media content before a threshold portion of the media content has been recorded;
determine that the recorded media content exceeds the threshold portion of the media content;
select a representative frame in a second portion of the recorded media content that is representative of the media content; and
form a permanent thumbnail based at least in part on selecting the representative frame; and
an electronic program guide (EPG) user interface to present the temporary thumbnail until the permanent thumbnail is formed and thereafter present the permanent thumbnail instead of the temporary thumbnail as identifiers of the media content.

18. A device as claim 17 recites, further comprising a cache to store the temporary thumbnail and the permanent thumbnail.

19. A device as claim 17 recites, wherein selecting the representative frame is based at least in part on a scene analysis that is performed on a plurality of frames corresponding to the recorded media content to select a particular frame of the plurality of frames based at least in part on metadata associated with the media content.

20. A device as claim 17 recites, wherein the permanent thumbnail comprises:
a still image corresponding to the representative frame; or
a dynamic image, the dynamic image comprising at least one image corresponding to the representative frame and one or more additional images that are played in a continuous loop to cause the permanent thumbnail to appear animated.

* * * * *